(12) United States Patent
Segapelli

(10) Patent No.: US 10,205,879 B2
(45) Date of Patent: *Feb. 12, 2019

(54) ELECTRONIC IMAGE STABILIZATION FREQUENCY ESTIMATOR

(71) Applicant: GoPro, Inc., San Mateo, CA (US)

(72) Inventor: Loic Segapelli, Oakland, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/666,509

(22) Filed: Aug. 1, 2017

(65) Prior Publication Data

US 2018/0048821 A1 Feb. 15, 2018

Related U.S. Application Data

(63) Continuation of application No. 15/140,391, filed on Apr. 27, 2016, now Pat. No. 9,756,249.

(51) Int. Cl.
- *H04N 5/232* (2006.01)
- *H04N 5/14* (2006.01)
- *H04N 5/21* (2006.01)

(52) U.S. Cl.
CPC ......... *H04N 5/23258* (2013.01); *H04N 5/144* (2013.01); *H04N 5/21* (2013.01);
(Continued)

(58) Field of Classification Search
CPC .......... H04N 5/23258; H04N 5/23267; H04N 5/2328; H04N 5/23261; H04N 5/23287; H04N 5/228
(Continued)

(56) References Cited

U.S. PATENT DOCUMENTS

| | | | |
|---|---|---|---|
| 9,756,249 B1 * | 9/2017 | Segapelli | ........... H04N 5/23258 |
| 2009/0160948 A1 | 6/2009 | Tabuchi | |

(Continued)

FOREIGN PATENT DOCUMENTS

| | | |
|---|---|---|
| EP | 3 001 676 A1 | 3/2016 |
| EP | 3001676 | 3/2016 |

OTHER PUBLICATIONS

PCT International Search Report and Written Opinion for PCT/US2017/023452, dated Jun. 16, 2017, 14 Pages.

*Primary Examiner* — Lin Ye
*Assistant Examiner* — Marly Camargo
(74) *Attorney, Agent, or Firm* — Young Basile Hanlon & MacFarlane, P.C.

(57) ABSTRACT

Disclosed are a system and a method for determining enabling or disabling electronic image stabilization (EIS) for a video frame. An image sensor of a camera system captures a video stream that comprises a plurality of video frames. An image processor determines availability of a computational resource that may process application of EIS on each video frame. Simultaneously, the image processor receives motion data of the camera system from a gyroscope. Based on the computational resource availability, a motion frequency threshold is determined. Based on the gyroscope motion data, a motion frequency of each video frame is estimated. The estimated motion frequency is compared to the determined motion frequency threshold. If the estimated motion frequency is greater than the determined motion frequency threshold, application of EIS is disabled. If the estimated motion frequency is less than or equal to the determined motion frequency threshold, application of EIS is enabled.

20 Claims, 6 Drawing Sheets

(52) U.S. Cl.
CPC ....... *H04N 5/2328* (2013.01); *H04N 5/23261* (2013.01); *H04N 5/23267* (2013.01); *H04N 5/23238* (2013.01)

(58) Field of Classification Search
USPC ....... 348/208.99, 208.1, 208.2, 208.3, 208.4, 348/208.5, 241, 699–701
See application file for complete search history.

(56) References Cited

U.S. PATENT DOCUMENTS

| | | |
|---|---|---|
| 2011/0115926 A1 | 5/2011 | McLeod et al. |
| 2011/0234825 A1* | 9/2011 | Liu .................... H04N 5/23248 348/208.5 |
| 2011/0243532 A1 | 10/2011 | Bostaph et al. |
| 2011/0298936 A1* | 12/2011 | Watanabe .......... H04N 5/23219 348/208.4 |
| 2011/0298937 A1 | 12/2011 | Ogawa et al. |
| 2012/0069203 A1* | 3/2012 | Voss ....................... H04N 5/144 348/208.1 |
| 2014/0085492 A1 | 3/2014 | Petrescu et al. |
| 2014/0184834 A1* | 7/2014 | Miyasako .......... H04N 5/23254 348/208.1 |
| 2014/0211032 A1 | 7/2014 | Owen et al. |
| 2014/0303687 A1 | 10/2014 | Wall et al. |

* cited by examiner

ELECTRONIC IMAGE STABILIZATION FREQUENCY ESTIMATOR

CROSS REFERENCE TO RELATED APPLICATIONS

This application is a continuation of U.S. application Ser. No. 15/140,391, filed Apr. 27, 2016, now U.S. Pat. No. 9,756,249, which is incorporated by reference in its entirety.

BACKGROUND

Field of Art

This disclosure relates to electronic image stabilization on a camera system, and more specifically, to estimating motion frequency of a camera system.

Description of Art

Digital cameras are increasingly used to capture videos in a variety of settings, for instance outdoors or in a sports environment. Most of the outdoor activities or sports environment involves rapid changes of terrains or sudden changes in motion, leading to jitter within video frames Image stabilization techniques may be used to reduce the jitter within frames that is associated with the motion of the camera. However, the processor resources required for stabilizing the image may depend on the amount of changes associated with the motion of the camera. If the change in the motion is more frequent, then a large amount of processor resources may be required for stabilizing the image. Additionally, if the frequency is too high, the application of image stabilization technique may make the final result worse.

As users capture increasingly more and longer videos, and with limited processor resources, the image stabilization becomes increasingly difficult.

BRIEF DESCRIPTIONS OF THE DRAWINGS

The disclosed embodiments have other advantages and features which will be more readily apparent from the following detailed description of the invention and the appended claims, when taken in conjunction with the accompanying drawings, in which:

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Disclosed by way of example embodiments, is a system and a method for determining a motion frequency threshold that further determines enabling or disabling of electronic image stabilization in real time for a video frame. An image sensor of a camera system captures a video stream that includes a plurality of frames. In some embodiments, the camera may be mounted on a camera mount attached to a user performing a sporting activity. Most of the sporting activities involve rapid changes of terrain or sudden changes in motion that make it desirable for the camera system to capture the video stream at a high frame rate, and simultaneously perform electronic image stabilization (EIS) for each frame.

The sudden changes in motion may worsen the effect of EIS if a computational delay exceeds the time period associated with the motion frequency. Along with capturing the video stream, the system determines available computational resources and determines a motion frequency threshold based on the available resources. Simultaneously, the system receives data from a gyroscope that includes data related to changes in motion from one video frame to the next. Based on the gyroscope data, the system estimates the current motion frequency pattern. The estimated motion frequency is compared to the determined motion frequency threshold. If the estimated motion frequency is greater than the threshold, EIS is not performed on the current video frame. The EIS determination may be done on each video frame or may be done on a plurality of video frames of a video stream, thus avoiding the need to buffer frames and post process them for motion compensation.

Example System Configuration

Figure 1:
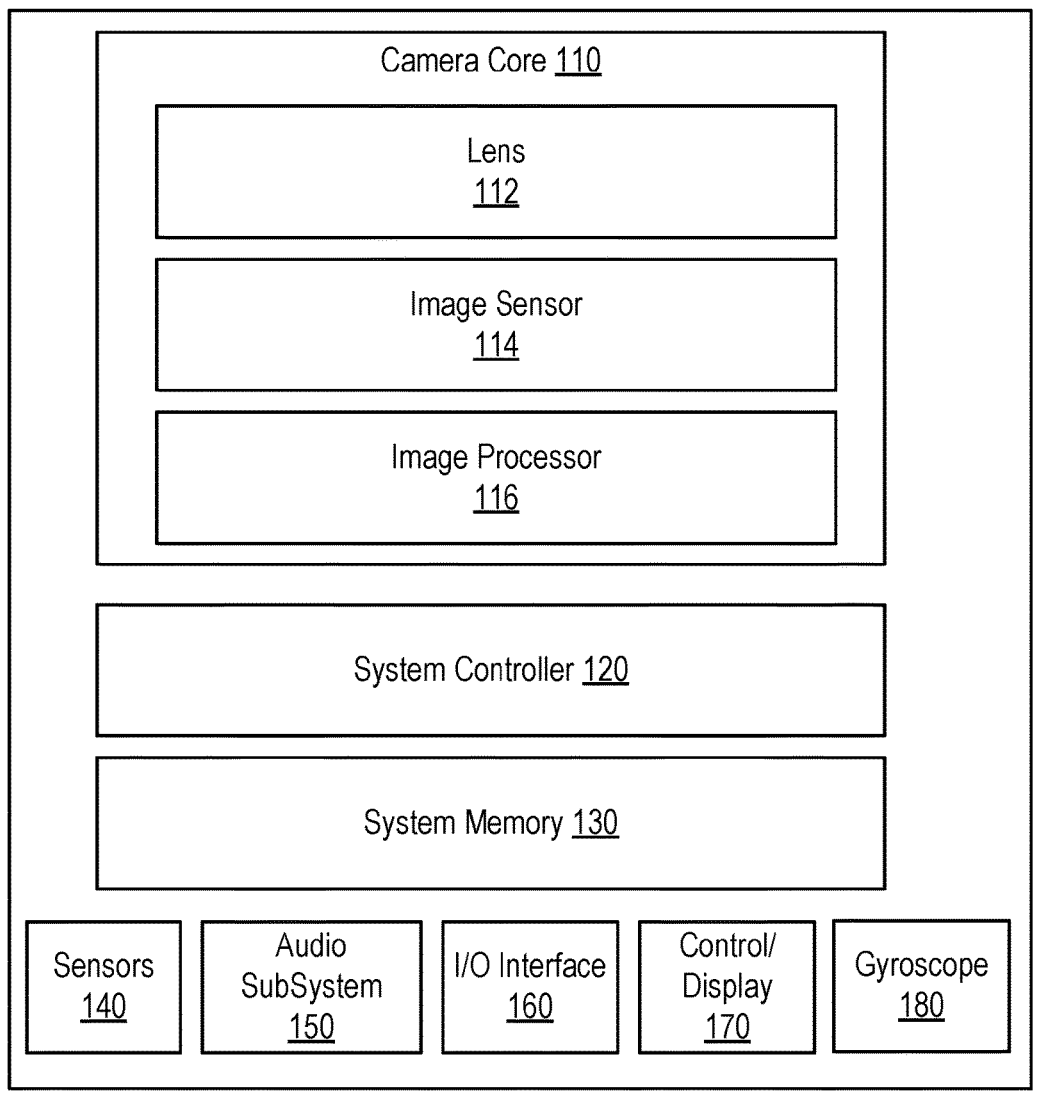
FIG. 1 illustrates an example camera system for motion frequency estimation, according to one embodiment.

Turning now to Figure (FIG. 1, illustrated is an example camera system for motion frequency estimation, according to one embodiment. The camera system 100 may include a camera body, one or more a camera lenses, various indicators on the camera body (such as LEDs, displays, and the like), various input mechanisms (such as buttons, switches, and touch-screen mechanisms), and electronics (e.g., imaging electronics, power electronics, metadata sensors, etc.) internal to the camera body for capturing images via the one or more lenses and/or performing other functions. In one embodiment, the camera 100 is capable of capturing spherical or substantially spherical content. The spherical content may include still images or video having spherical or substantially spherical field of view. Alternatively, the camera 100 may capture substantially spherical images or video having less than 360 degrees in the horizontal direction and less than 180 degrees in the vertical direction (e.g., within 10% of the field of view associated with fully spherical content). In other embodiments, the camera 100 may capture images or video having a non-spherical wide angle field of view.

As described in greater detail below, the camera 100 may include sensors to capture metadata associated with video data, such as timing data, motion data, speed data, acceleration data, altitude data, GPS data, and the like. Additionally, the camera 100 may include processors or stabilizers to provide motion compensation by performing electronic image stabilization.

Referring now to the details of FIG. 1, the camera 100 comprises a camera core 110 comprising a lens 112, an image sensor 114, and an image processor 116. The camera 100 additionally includes a system controller 120 (e.g., a microcontroller or microprocessor) that controls the operation and functionality of the camera 100 and system memory 130 configured to store executable computer instructions that, when executed by the system controller 120 and/or the image processors 116, perform the camera functionalities described herein. In some embodiments, a camera 100 may include multiple camera cores 110 to capture fields of view in different directions which may then be stitched together to form a cohesive image. For example, in an embodiment of a spherical camera system, the camera 100 may include two camera cores 110 each having a hemispherical or hyper hemispherical lens that each captures a hemispherical or hyper hemispherical field of view which is stitched together in post-processing to form a spherical image.

The lens 112 may be, for example, a wide angle lens, hemispherical, or hyper hemispherical lens that focuses light entering the lens to the image sensor 114 which captures images and/or video frames. The image sensor 114 may capture high-definition images having a resolution of, for example, 720p, 1080p, 4 k, or higher. In one embodiment, spherical video is captured as a 5760 pixels by 2880 pixels with a 360 degree horizontal field of view and a 180 degree vertical field of view. For video, the image sensor 114 may capture video at frame rates of, for example, 30 frames per second, 60 frames per second, or higher.

The image processor 116 performs one or more image processing functions of the captured images or video. For example, the image processor 116 may perform electronic image stabilization (EIS), a Bayer transformation, demosaicing, noise reduction, image sharpening, image stabilization, rolling shutter artifact reduction, color space conversion, compression, or other in-camera processing functions. Processed images and video may be temporarily or persistently stored to system memory 130 and/or to a non-volatile storage, which may be in the form of internal storage or an external memory card.

An input/output (I/O) interface 160 transmits and receives data from various external devices. For example, the I/O interface 160 may facilitate the receiving or transmitting video or audio information through an I/O port. Examples of I/O ports or interfaces include USB ports, HDMI ports, Ethernet ports, audio ports, and the like. Furthermore, embodiments of the I/O interface 160 may include wireless ports that can accommodate wireless connections. Examples of wireless ports include Bluetooth, Wireless USB, Near Field Communication (NFC), and the like. The I/O interface 160 may also include an interface to synchronize the camera 100 with other cameras or with other external devices, such as a remote control, a second camera, a smartphone, a client device, or a video server.

A control/display subsystem 170 includes various control and display components associated with operation of the camera 100 including, for example, LED lights, a display, buttons, microphones, speakers, and the like. The audio subsystem 150 includes, for example, one or more microphones and one or more audio processors to capture and process audio data correlated with video capture. In one embodiment, the audio subsystem 150 includes a microphone array having two or microphones arranged to obtain directional audio signals.

Sensors 140 capture various metadata concurrently with, or separately from, video capture. For example, the sensors 140 may capture time-stamped location information based on a global positioning system (GPS) sensor, and/or an altimeter. Other sensors 140 may be used to detect and capture orientation of the camera 100 including, for example, an orientation sensor, an accelerometer, or a magnetometer. Sensor data captured from the various sensors may be processed to generate other types of metadata.

In one embodiment, the sensors 140 may be rigidly coupled to the camera 100 such that any motion, orientation or change in location experienced by the camera 100 is also experienced by the sensors 140. The sensors 140 furthermore may associates a time stamp representing when the data was captured by each sensor. In one embodiment, the sensors 140 automatically begin collecting sensor metadata when the camera 140 begins recording a video.

In addition to the generic sensors, a specialized sensor may be included such as the gyroscope 180. The gyroscope may be used to generate motion metadata, comprising velocity representative of motion of the camera 100, acceleration vectors may be derived from the motion metadata received from the gyroscope. The gyroscope sensor data may include sensing vibrations on the camera produced by external factors that is measured along three axes representing three directions. The gyroscope data is discussed in detail below with respect to FIG. 2. The gyroscope sensor data is transmitted by the sensors to the image processor 116 for processing the image/video frame.

Figure 2:
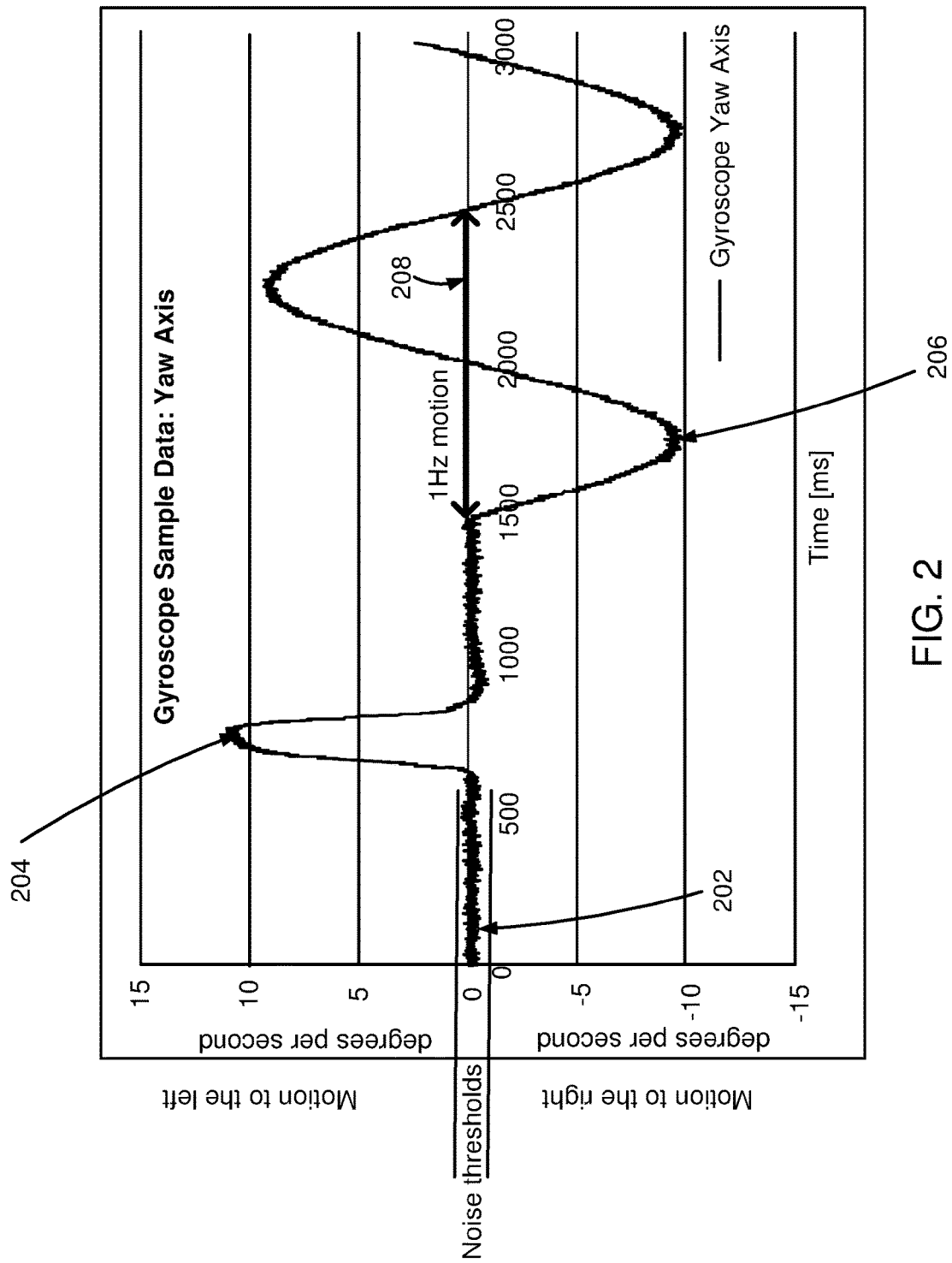
FIG. 2 illustrates an example of gyroscope sample data, according to one embodiment.

FIG. 2 illustrates an example of gyroscope sample data, according to one embodiment. The image sensor 114 captures an image/video frame. Simultaneously, the gyroscope 180 gathers motion data along three axes, i.e. a pitch (lateral) axis, a roll (longitudinal) axis and a yaw (perpendicular) axis. The three axes represent the angles of rotation of the camera in three dimensions about the camera's center of gravity.

The illustrated graph of FIG. 2 shows gyroscope data collected for the yaw axis. The frequency of rotation of each dimension is different from each other. The X-axis of the gyroscope data represents time and the Y-axis represents the displacement in degrees per second. A positive displacement 204 (e.g., the motion is measured as positive degrees per second) indicates that the camera (or any other object) attached to the gyroscope is moving the left relative to its previous position. A negative displacement 206 (e.g., the motion is measured as negative degrees per second) indicates that the camera is moving to the right relative to its previous position. Furthermore, an increasing displacement indicates that the motion is accelerating to the left or decelerating to the right, while a decreasing displacement indicates that the motion is decelerating to the left or accelerating to the right. A displacement of zero or a small displacement within a noise margin 202 indicates that the camera is not moving or has a very small motion within the noise margin 202.

The amount of displacement is indicated as a measure of degrees per second. For example, the spike in the upward direction 204 shows a displacement of about 11 degrees per second to the left on the yaw axis at its peak velocity. The spike in the downward direction 206 shows a displacement of around 9 degrees per second to the right on the yaw axis at its peak velocity. A sinusoidal pattern of the gyroscope data represents frequent motion changes indicating an oscillating left and right movement. In one embodiment, a frequency of the motion is calculated based on the time period of each sinusoid of the yaw axis, for example, 1 Hz motion frequency 208 calculated based on a time period of 1000 milliseconds measured for an oscillation cycle on the yaw axis, representing a motion to the right and back to the left.

Motion Frequency Estimation

Figure 3:
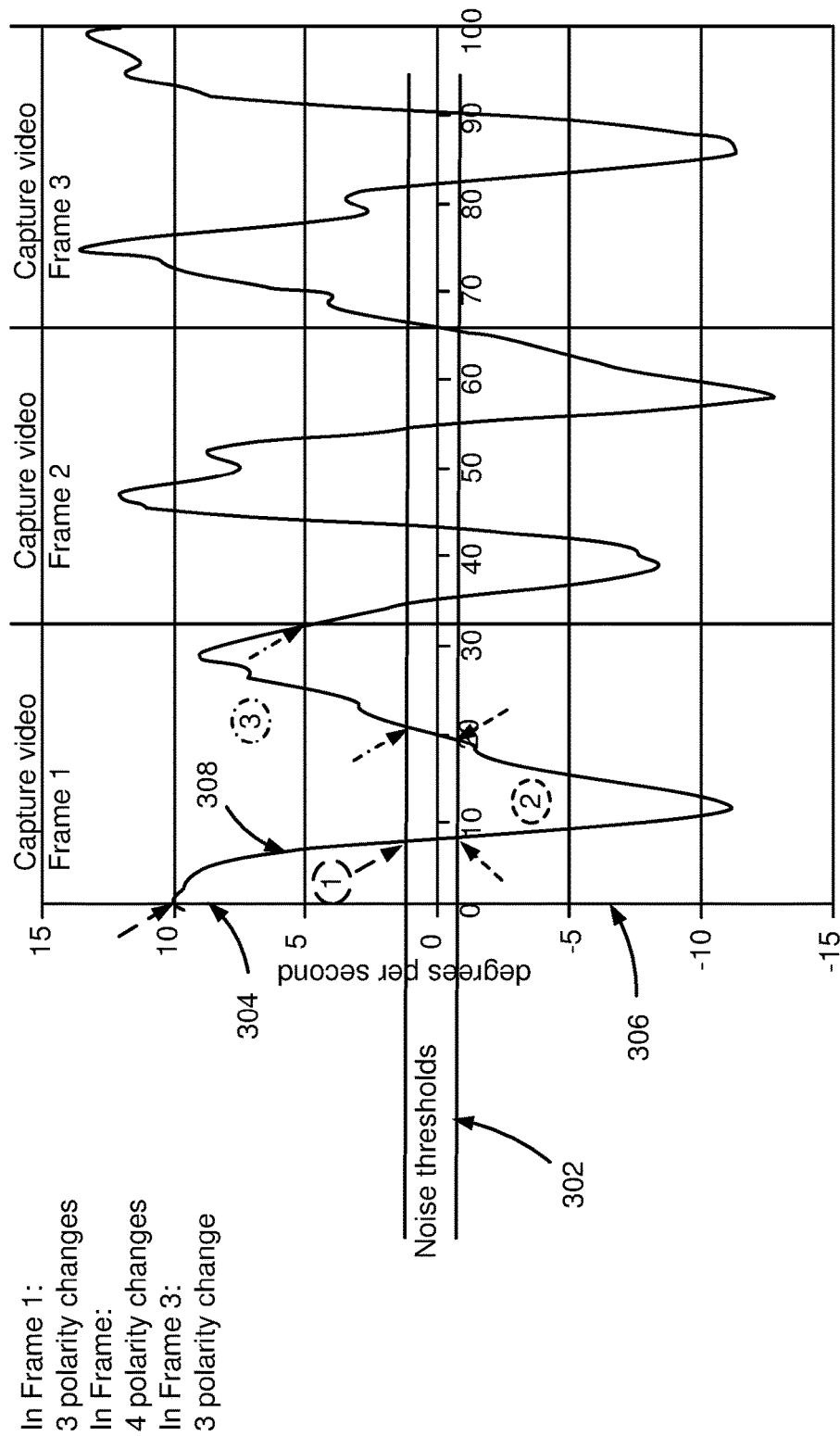
FIG. 3 illustrates an example implementation of a method for estimating motion frequency, according to one embodiment.

FIG. 3 illustrates an example implementation of a method for estimating motion frequency, according to one embodiment. The example shows gyroscope data for three video frames. The Y-axis primarily represents three regions, a noise threshold region 302, a positive displacement region 304 and a negative displacement region 306. In the noise threshold region 302, the camera is generally stable and not moving with high velocity. In the positive displacement region 304, the gyroscope data shows that the camera is moving to the left. In the negative displacement region 306, the gyroscope data shows that the camera is moving to the right.

For each video frame, the number of polarity changes 308 in the detected motion is determined. In this context, a polarity change is a transition from a positive displacement region 304 to a negative displacement region 306 or vice versa that crosses the noise threshold region 302. A polarity change is also counted at the beginning of each frame, in one embodiment. For example, in the illustrated data, 3 polarity changes are detected for frame one, 4 polarity changes for frame two and 3 polarity changes for frame three. A total number of polarity changes are calculated for a preconfigured number of frames. For example, in the illustrated graph, 10 polarity changes are counted over three frames. The motion frequency is estimated based on the total number of polarity changes over the time period of the total number of frames. For example, in the illustrated graph, 10 polarity changes occur in 100 milliseconds, which correspond to approximately 100 polarity changes in a second. This estimates a motion frequency of approximately 50 Hz.

In one embodiment, the preconfigured number of frames over which the frequency is estimated may be included in a sliding window. In a sliding window, there is a partial overlap of frames used in each successive frequency estimate. The number of polarity changes for a given window may be to estimate the frequency of the last frame in the window. Alternatively, the estimated motion frequency for a given window may be used as the estimate for the center frame of the window. In cases where a sliding window is used, the total number of polarity changes of each frame may be propagated forward, thus reducing the needed buffer space. For example, to estimate the motion frequency associated with frame n, the number of polarity changes in frames n−2 through n are used. The counts for each frame are also stored in a buffer. Next, to estimate the motion frequency associated with the frame n+1, the number of polarity changes in frames n−1 through n+1 are used, and so on. Here, the number of polarity changes in frame n+1 are counted. The counts for frames n−1 and n may be already stored in the buffer and can be read from the buffer to perform the frequency estimation. Furthermore, the count for frame n+1 may be stored to the buffer replacing the oldest value in the buffer (e.g., the count from frame n−2). In this way, a limited size buffer may be used and counts need not be re-performed for every frame of the window.

A high motion frequency may cause significant performance degradation and affect the image/video frame quality, such as jitter within frames and other such degradation. An image processor performs electronic image stabilization (EIS) techniques to reduce the jitter within frames, the jitter associated with the motion frequency.

Figure 4:
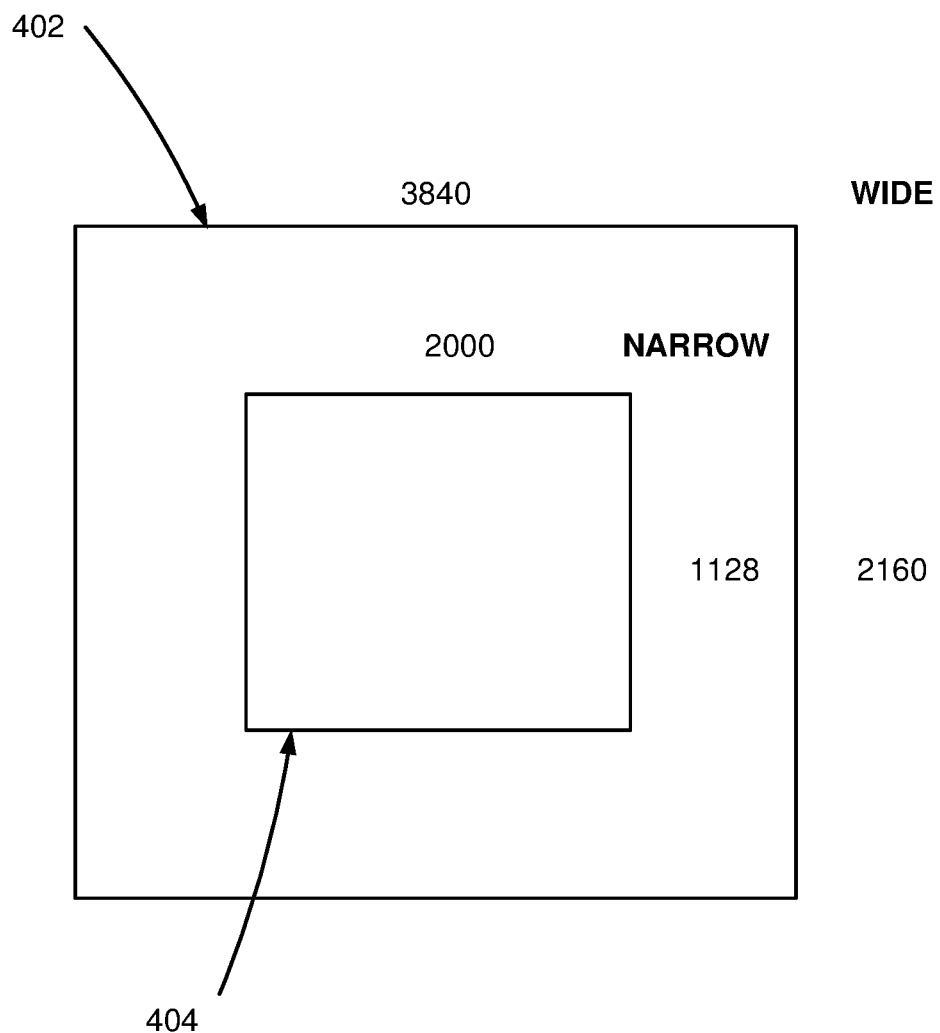
FIG. 4 illustrates an example method of electronic image stabilization of a video frame, according to one embodiment.

FIG. 4 illustrates an example capture window and view window used for electronic image stabilization of a video frame, according to one embodiment. An image processor captures a video frame in a capture window 402 that is greater than an output view window 404. For example, the capture window is 3840×2160 pixels and the output view window is 2000×1128 pixels. Based on the motion data analyzed from the gyroscope for a given frame relative to a reference frame, the output view window is adjusted within the capture window to compensate for the camera motion between the reference frame and the given frame. For example, if the gyroscope data indicates motion to the right by x pixels, the output view window is moved to the left by x pixels or vice versa to compensate for the motion. Thus stationary objects in the scene may appear stationary despite the camera movement.

In one embodiment, the EIS is one of a plurality of tasks performed by an image processor. Each task accesses shared resources such as memory, processor, signal processor, etc. The EIS competes with the plurality of other tasks to access these shared resources. This may lead to computational delays when performing the EIS task. If the computational delay for processing the EIS exceeds a frame rate by less than a time period, the EIS compensation may worsen the jitter effect, leading to performance degradation rather than an improvement. The frame rate may be derived from the motion frequency pattern 208 as described earlier with respect to FIG. 2. Thus, if the EIS is not performed in a pre-configured period of time, the result of applying EIS to the video frame may be worse than not applying EIS at all. Hence for each video frame, a determination is made to enable or disable application of EIS based on the motion frequency determined from the gyroscope data and the computational load of the image processor. When EIS is enabled for a given frame, the view window 404 may be adjusted within the capture window 406 to compensate for the detected motion of the camera between the given frame and a reference frame. In contrast, when EIS is disabled for a given frame, the view window 404 is not adjusted and remains at a default position (e.g., centered or in the same location as the previous frame).

Figure 5:
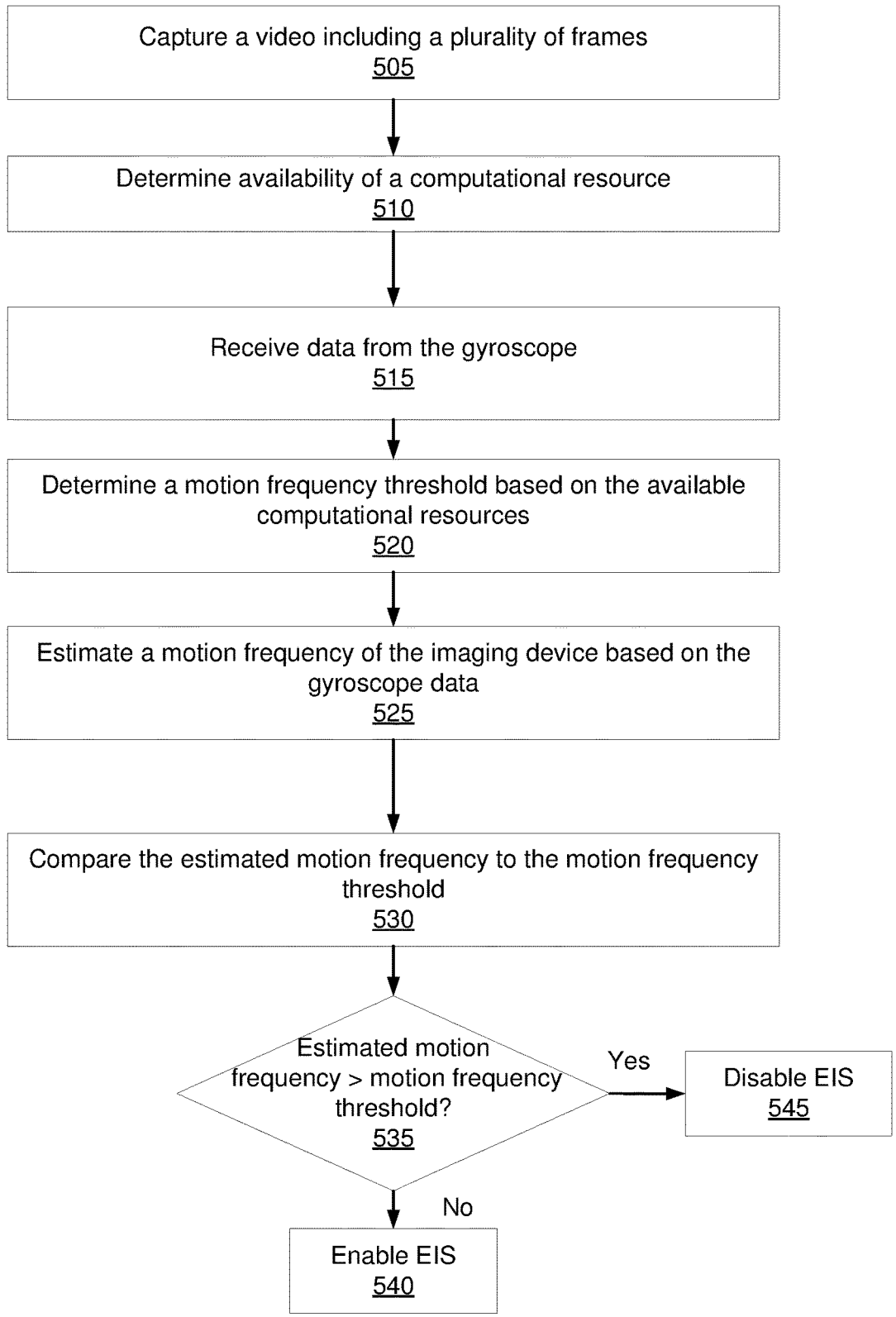
FIG. 5 illustrates a flowchart of a method for determining application of electronic image stabilization to a video frame, according to one embodiment.

FIG. 5 illustrates a flowchart of a method for controlling electronic image stabilization, according to one embodiment. An image sensor of a camera system captures 505 a video stream that includes a plurality of video frames. An image processor determines 510 availability of computational resources such as memory, processing unit, signal processor time, etc. on the camera system by measuring the current load on the system. The current load may be determined in a number of ways such as determining the number of tasks being performed, resources being used by each task, the number of tasks waiting in queue for resource availability and the like. The image processor simultaneously receives 515 motion data for each axis from the gyroscope.

Based on the availability of computational resources, a motion frequency threshold is determined 520. For example, if the video frame rate is low and there are about two tasks running that need a few cycles of the processor, the motion frequency threshold is set to a relatively high threshold value. Alternatively, if the video frame rate is high and there are tasks running on each thread of the processor and few tasks waiting in the pipeline/queue, the motion frequency threshold is set to a relatively low threshold value. A motion frequency of each video frame is estimated 525 in parallel from the gyroscope data by the method described with respect to FIG. 3.

The estimated motion frequency is compared 535 to the determined motion frequency threshold. In one embodiment, if the estimated motion frequency is greater than the motion frequency threshold, it is highly likely that applying EIS to the video frame may worsen the jitter within video frames due to a computational delay and hence EIS is disabled 545. If the estimated motion frequency is less than or equal to the motion frequency threshold, EIS is enabled 540 and applied to the video frame. The EIS may be disabled or enabled using a switching element such as a toggle switch, a switching flag that can be set to 1 for enabling and 0 for disabling or any other such switching element.

In the above embodiment, if the estimated motion frequency is within a short range around the motion frequency threshold, the estimated motion frequency may frequently switch between being above or below the motion threshold. To avoid a resultant frequent switching of the EIS on and off, in an alternate embodiment, two motion frequency thresholds are determined for each frame, a lower motion frequency threshold and an upper motion frequency threshold. For example, the lower motion frequency threshold may be at a 10% lower frequency than the determined baseline motion frequency threshold and an upper motion frequency threshold may be at a 10% higher frequency than the determined baseline motion frequency threshold. Application of EIS is enabled if the estimated motion frequency is below or equal to the lower motion frequency threshold and EIS is disabled if the estimated motion frequency is higher than the upper motion frequency threshold. When the estimated motion frequency is between the lower and upper thresholds, the EIS enabled/disabled state remains the same as in the previous frame.

In another embodiment, to avoid the rapid switching, a tapering motion frequency threshold may be applied. A tapering motion frequency threshold is configured to be at a certain percentage of the determined motion frequency threshold, for example 50% of the determined baseline motion frequency. If the estimated motion frequency is below or equal to the tapering motion frequency threshold, EIS is enabled and a 100% EIS is applied to the video frame. If the estimated motion frequency is greater than the determined baseline motion frequency threshold, EIS is disabled and not applied to the video frame. If the estimated motion frequency is between the tapering motion frequency threshold and the determined baseline motion frequency threshold, EIS is enabled and a partial EIS is applied to the video frame. The EIS level here is determined as a percentage of the shift that would be applied to fully stabilize the frame. Furthermore, the EIS level may vary inversely to the estimated motion frequency within the range between the tapering motion frequency threshold and the determined baseline motion frequency threshold. For example 90% EIS may be applied when an estimated motion frequency is 10% above the tapering motion frequency threshold.

In an illustrative example, the baseline motion frequency threshold is determined to be at 100 Hz, and the tapering motion frequency threshold is configured at 50 Hz. For a given frame, it is determined that the frame moved to the camera moved 100 pixels to the right relative to a reference frame. When the estimated motion frequency is at 40 Hz (below the tapering motion frequency threshold), 100% EIS is applied. Thus, in this example, the view window is moved to the left by 100 pixels in the capture window to fully stabilize the frame. When the estimated motion frequency is at 60 Hz (above the tapering motion frequency threshold but below the baseline motion frequency threshold), 80% of EIS is applied. Thus, the view window is moved to the left by 80 pixels instead of 100 pixels in the capture window, only partially stabilizing the frame. The amount of applied EIS decreases (e.g., linearly or non-linearly) as the estimated motion frequency progresses closer to the determined motion frequency threshold.

Computing Machine Architecture

Figure 6:
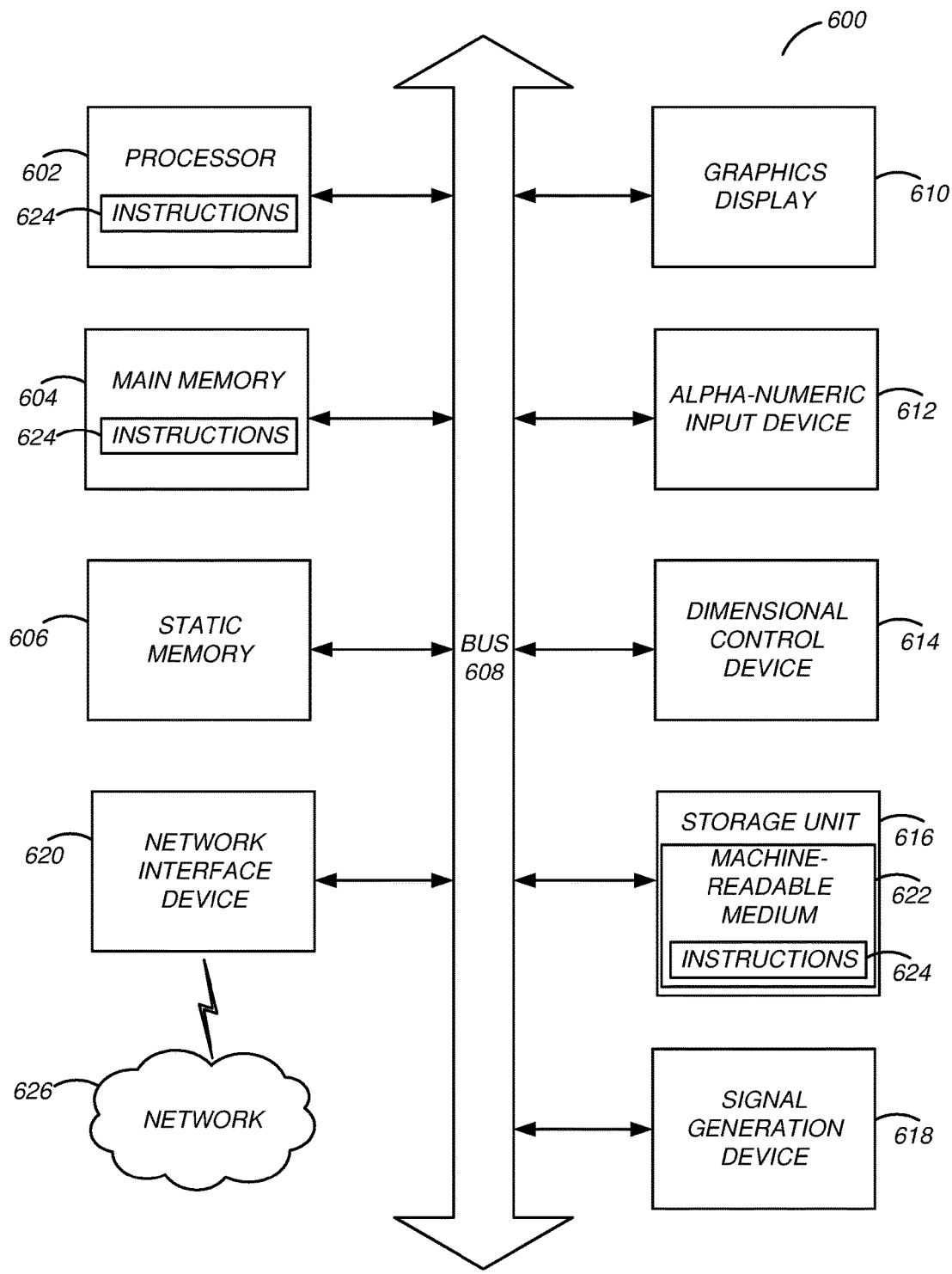
FIG. 6 illustrates an example machine for use with a system for motion frequency estimation, according to one embodiment.

FIG. 6 is a block diagram illustrating components of an example machine able to read instructions from a machine-readable medium and execute them in a processor (or controller). Specifically, FIG. 6 shows a diagrammatic representation of a machine in the example form of a computer system 600 within which instructions 624 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 624 (sequential or otherwise) that specify actions to be taken by that machine. Further, while only a single machine is illustrated, the term "machine" shall also be taken to include any collection of machines that individually or jointly execute instructions 624 to perform any one or more of the methodologies discussed herein. For example, the computer system 600 may be used to determine enabling or disabling of electronic image stabilization as described by the processes of FIGS. 2-5.

Looking closer at the example computer system 600, it includes one or more processors 602 (generally processor 602) (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 604, and a static memory 606, which are configured to communicate with each other via a bus 608. The computer system 600 may further include graphics display unit 610 (e.g., a plasma display panel (PDP), a liquid crystal display (LCD), a projector, or a cathode ray tube (CRT)). The computer system 600 may also include alphanumeric input device 612 (e.g., a keyboard), a cursor control device 614 (e.g., a mouse, a trackball, a joystick, a motion sensor, or other pointing instrument), a storage unit 616, a signal generation device 618 (e.g., a speaker), and a network interface device 620, which also are configured to communicate via the bus 808.

The storage unit 616 includes a machine-readable medium 622 on which is stored instructions 624 (e.g., software) embodying any one or more of the methodologies or functions described herein. The instructions 624 (e.g., software) may also reside, completely or at least partially, within the main memory 604 or within the processor 602 (e.g., within a processor's cache memory) during execution thereof by the computer system 600, the main memory 604 and the processor 602 also constituting machine-readable media. The instructions 624 (e.g., software) may be transmitted or received over a network 626 via the network interface device 620.

While machine-readable medium 622 is shown in an example embodiment to be a single medium, the term "machine-readable medium" should be taken to include a single medium or multiple media (e.g., a centralized or distributed database, or associated caches and servers) able to store instructions (e.g., instructions 624). The term "machine-readable medium" shall also be taken to include any medium that is capable of storing instructions (e.g., instructions 624) for execution by the machine and that cause the machine to perform any one or more of the methodologies disclosed herein. The term "machine-readable medium" includes, but not be limited to, data repositories in the form of solid-state memories, optical media, and magnetic media. It is noted that the instructions 624 may correspond to the processes of estimating motion frequency and determining application of EIS to a video frame as described in FIGS. 3-6.

Additional Configuration Considerations

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs for the disclosed embodiments as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those, skilled in the art, may be made in the arrangement, operation and details of the method and apparatus disclosed herein without departing from the spirit and scope defined in the appended claims.

What is claimed is:

1. A method for controlling electronic image stabilization, the method comprising:

capturing a video stream comprising a plurality of frames;

receiving data from a gyroscope, the gyroscope connected to an imaging device, wherein the data from the gyroscope includes sensed motion of the imaging device during capture of a video stream;

estimating a motion frequency of the imaging device during capture of the video stream from the data received from the gyroscope;

comparing the estimated motion frequency of the imaging device to a motion frequency threshold; and performing, in response to the estimated motion frequency meeting a first criteria based on a baseline motion frequency threshold, electronic image stabilization on the one or more frames of the video.

2. The method of claim 1, wherein the data further includes at least one of a positive displacement or a negative displacement, wherein the positive displacement indicates movement in a first direction and the negative displacement indicates movement in a second direction opposite the first direction.

3. The method of claim 2, further comprising:

determining a number of polarity changes in the sensed motion from the data from the gyroscope during capture of the one or more frames, wherein the polarity changes indicate at least one of a change in motion from the first direction to the second direction or a change in motion from the second direction to the first direction.

4. The method of claim 1, wherein estimating the motion frequency further comprises:

determining, for each video frame of the video stream, a number of polarity changes in the gyroscope data indicating at least one of a change from a motion in first direction that exceeds a first noise threshold to a motion in a second direction that exceeds a second noise threshold or a change from a motion in the second direction that exceeds the second noise threshold to a motion in the first direction that exceeds the first noise threshold;

determining a total number of polarity changes over a window of video frames of the video stream;

determining a total time of capture of the window of the video frames of the video stream; and estimating the motion frequency based on the total number of polarity changes and the total time of the window of the video frames of the video stream.

5. The method of claim 1, wherein the motion frequency is estimated on a sliding window of a plurality of video frames of the video stream.

6. The method of claim 1, further comprising:

determining a lower motion frequency threshold below the baseline motion frequency threshold and an upper motion frequency threshold above the baseline motion frequency threshold; and determining that the estimated motion frequency meets the first criteria if the estimated motion frequency is below the lower motion frequency threshold and determining that the estimated motion frequency meets the second criteria if the estimated motion frequency is above the upper motion frequency threshold.

7. The method of claim 6, further comprising:

determining that the estimated motion frequency meets the first criteria if the estimated motion frequency is above the lower motion frequency threshold and below the upper motion frequency threshold and a last motion frequency met the first criteria; and determining that the estimated motion frequency meets the second criteria if the estimated motion frequency is above the lower motion frequency threshold and below the upper motion frequency threshold and the last motion frequency met the second criteria.

8. The method of claim 1, further comprising:
determining a tapering motion frequency threshold based on the baseline motion frequency threshold;
determining that the estimated motion frequency meets the first criteria if the estimated motion frequency is below the tapering motion frequency threshold, determining that the estimated motion frequency meets the second criteria if the estimated motion frequency is above the baseline motion frequency threshold, and determining that the estimated motion frequency meets a third criteria if the estimation motion frequency is between the tapering motion frequency threshold and the baseline motion frequency threshold; and
responsive to the estimated motion frequency meeting the third criteria, applying a partial electronic image stabilization to the one or more frames, a stabilization level of the partial electronic image stabilization varying inversely to the estimated motion frequency.

9. A non-transitory computer readable medium configured to store instructions for controlling electronic image stabilization, the instructions when executed by a processor cause the processor to perform steps including:
capturing a video stream comprising a plurality of frames;
receiving data from a gyroscope, the gyroscope connected to an imaging device, wherein the data from the gyroscope includes sensed motion of the imaging device during capture of a video stream;
estimating a motion frequency of the imaging device during capture of the video stream from the data received from the gyroscope;
comparing the estimated motion frequency of the imaging device to a motion frequency threshold; and
performing, in response to the estimated motion frequency meeting a first criteria based on a baseline motion frequency threshold, electronic image stabilization on the one or more frames of the video.

10. The non-transitory computer readable storage medium of claim 9, wherein the gyroscope data further includes at least one of a positive displacement or a negative displacement, wherein the positive displacement indicates movement in a first direction and the negative displacement indicates movement in a second direction opposite the first direction.

11. The non-transitory computer readable storage medium of claim 10, wherein the instructions further cause the processor to determine a number of polarity changes in the sensed motion from the data from the gyroscope during capture of the one or more frames, wherein the polarity changes indicate at least one of a change in motion from a first direction to a second direction or a change in motion from the second direction to the first direction.

12. The non-transitory computer readable storage medium of claim 9, wherein estimating the motion frequency further comprises:
determining, for each video frame of the video, a number of polarity changes in the gyroscope data indicating at least one of a change from a motion in a first direction that exceeds a first noise threshold to a motion in a second direction that exceeds a second noise threshold or a change from a motion in the second direction that exceeds the second noise threshold to a motion in the first direction that exceeds the first noise threshold;
determining a total number of polarity changes over a window of video frames of the video stream;
determining a total time of capture of the window of video frames of the video stream; and
estimating the motion frequency based on the total number of polarity changes and the total time of the window of the video frames of the video stream.

13. The non-transitory computer readable storage medium of claim 9, wherein the motion frequency is estimated on a sliding window of a plurality of video frames of the video stream.

14. The non-transitory computer readable storage medium of claim 9, wherein the instructions further cause the processor to perform steps including:
determining a lower motion frequency threshold below the baseline motion frequency threshold and an upper motion frequency threshold above the baseline motion frequency threshold; and
determining that the estimated motion frequency meets the first criteria if the estimated motion frequency is below the lower motion frequency threshold and determining that the estimated motion frequency meets the second criteria if the estimated motion frequency is above the upper motion frequency threshold.

15. A camera device comprising:
an imaging device to capture a video stream;
a gyroscope to sense motion of the imaging device; a processor; and
a non-transitory computer readable medium configured to store instructions for controlling electronic image stabilization, the instructions when executed by the processor cause the processor to perform steps including:
capturing a video stream comprising a plurality of frames;
receiving data from a gyroscope, the gyroscope connected to an imaging device, wherein the data from the gyroscope includes sensed motion of the imaging device during capture of a video stream;
estimating a motion frequency of the imaging device during capture of the video stream from the data received from the gyroscope;
comparing the estimated motion frequency of the imaging device to a motion frequency threshold; and
performing, in response to the estimated motion frequency meeting a first criteria based on a baseline motion frequency threshold, electronic image stabilization on the one or more frames of the video.

16. The camera device of claim 15, wherein the gyroscope data further includes at least one of a positive displacement or a negative displacement, wherein the positive displacement indicates movement in a first direction and the negative displacement indicates movement in a second direction opposite the first direction.

17. The camera device of claim 16, wherein the instructions further cause the processor to determine a number of polarity changes in the sensed motion from the data from the gyroscope during capture of the one or more frames, wherein the polarity changes indicate at least one of a change in motion from a first direction to a second direction or a change in motion from the second direction to the first direction.

18. The camera device of claim 15, wherein estimating the motion frequency further comprises:
determining, for each video frame of the video, a number of polarity changes in the gyroscope data indicating at least one of a change from a motion in a first direction that exceeds a first noise threshold to a motion in a second direction that exceeds a second noise threshold or a change from a motion in the second direction that exceeds the second noise threshold to a motion in the first direction that exceeds the first noise threshold;

determining a total number of polarity changes over a window of video frames of the video stream;

determining a total time of capture of the window of video frames of the video stream; and estimating the motion frequency based on the total number of polarity changes and the total time of the window of the video frames of the video stream.

19. The camera device of claim 15, wherein the motion frequency is estimated on a sliding window of a plurality of video frames of the video stream.

20. The camera device of claim 15, wherein the instructions further cause the processor to perform steps including:

determining a lower motion frequency threshold below the baseline motion frequency threshold and an upper motion frequency threshold above the baseline motion frequency threshold; and determining that the estimated motion frequency meets the first criteria if the estimated motion frequency is below the lower motion frequency threshold and determining that the estimated motion frequency meets the second criteria if the estimated motion frequency is above the upper motion frequency threshold.

* * * * *